United States Patent [19]
Pasch

[11] Patent Number: 6,138,127
[45] Date of Patent: Oct. 24, 2000

[54] APPARATUS AND METHOD FOR RECYCLING AN OBJECT

[75] Inventor: Mark Alan Pasch, Rochester, Minn.

[73] Assignee: International Business Machines Corporation, Armonk, N.Y.

[21] Appl. No.: 09/081,145

[22] Filed: May 19, 1998

[51] Int. Cl.⁷ .................................................. G06F 17/30
[52] U.S. Cl. ............................................ 707/206; 707/103
[58] Field of Search .................................. 707/206, 103, 707/104

[56] References Cited

U.S. PATENT DOCUMENTS

| | | | |
|---|---|---|---|
| 5,274,804 | 12/1993 | Jackson et al. | 707/206 |
| 5,392,432 | 2/1995 | Engelstad et al. | 707/103 |
| 5,535,390 | 7/1996 | Hildebrandt | 711/154 |
| 5,835,914 | 11/1998 | Brim | 707/206 |

OTHER PUBLICATIONS

Flanagan, David, "Java in a Nutshell, Second Edition", O'Reilly & Associates, Inc., May 1997, pp 29, 60–62.
Horowitz et al., Fundamentals of Data Structures, Section 4.3, p. 114–118 (1982).

*Primary Examiner*—Thomas G. Black
*Assistant Examiner*—William Trinh
*Attorney, Agent, or Firm*—Martin & Associates, L.L.C.; Derek P. Martin

[57] ABSTRACT

A class in an object oriented system may be made recyclable by inheriting a recycle() method from a recyclable class. When automatic garbage collection is attempted on an instance of a class that is recyclable, the garbage collector invokes the recycle() method on the instance to determine whether or not the instance should be disposed of by the garbage collector. One or more predetermined recycle criteria are used to determine whether a recyclable instance should, in fact, be recycled. If the instance satisfies the recycle criteria, appropriate recycling logic is executed to cause the instance to be recycled, and the garbage collection of the instance is not performed. If, however, the instance is not recyclable, or if it does not satisfy the recycling criteria, it is disposed of by the garbage collector.

20 Claims, 4 Drawing Sheets

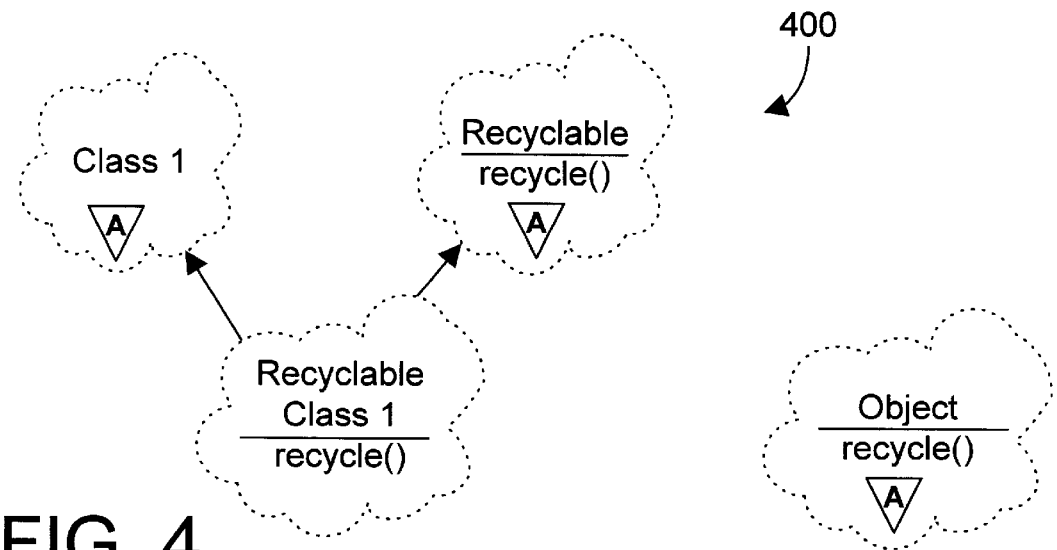
FIG. 4
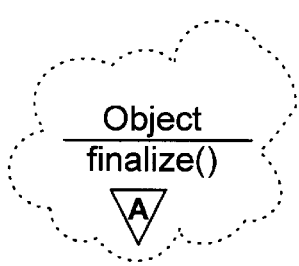
FIG. 5
FIG. 6
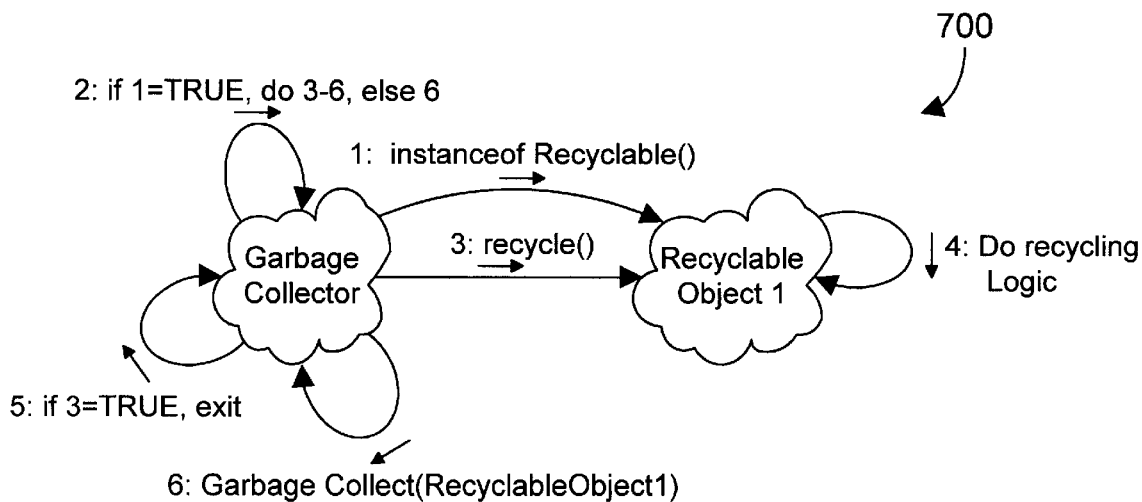
FIG. 7

APPARATUS AND METHOD FOR RECYCLING AN OBJECT

BACKGROUND OF THE INVENTION

1. Technical Field

This invention generally relates to object oriented programming and more specifically relates to an apparatus and method for recycling objects in an object oriented system.

2. Background Art

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated computer software has evolved to take advantage of the higher performance of the hardware, resulting in computer systems today that are much more powerful than just a few years ago.

Computer systems typically include operating system software that controls the basic function of the computer, and one or more software application programs that run under the control of the operating system to perform desired tasks. For example, a typical IBM Personal Computer may run the OS/2 operating system, and under the control of the OS/2 operating system, a user may execute an application program, such as a word processor. As the capabilities of computer systems have increased, the application software programs designed for high performance computer systems have become extremely powerful. Additionally, software development costs have continued to rise because more powerful and complex programs take more time, and hence more money, to produce.

One way in which the performance of application software programs has been improved while the associated development costs have been reduced is by using object oriented programming concepts. The goal of using object oriented programming is to create small, reusable sections of program code known as "objects" that can be quickly and easily combined and re-used to create new programs. This is similar to the idea of using the same set of building blocks again and again to create many different structures. The modular and re-usable aspects of objects will typically speed development of new programs, thereby reducing the costs associated with the development cycle. In addition, by creating and re-using a comprehensive set of well-tested objects, a more stable, uniform, and consistent approach to developing new computer programs can be achieved.

A central concept in object oriented programming is the "class." A class is a template that defines a type of object. A class outlines or describes the characteristics or makeup of objects that belong to that class. By defining a class, objects can be created that belong to the class without having to rewrite the entire definition for each new object. This feature of object oriented programming promotes the reusability of existing object definitions and promotes more efficient use of program code.

Modern object oriented programming languages have features that improve the convenience of programming in those languages. For example, the Java programming language developed by Sun Microsystems has a garbage collection feature that automatically disposes of objects that are no longer used. This automatic garbage collection takes away from the programmer the burden of tracking which objects are used and which are not, and disposing of objects that are no longer used.

In some situations, it may be desirable to recycle an object rather than dispose of it. In most object oriented systems, a control mechanism is used to create and delete objects. When a new object needs to be created, a request is made to the control mechanism, which allocates memory for the new object and returns a pointer to the new object. However, if there exists an old object that is an instance of the same class as the new object, it may be possible to recycle the old object by initializing the data in the object and returning a pointer to the object. If an unused object can be recycled in this manner, the time-consuming process of allocating memory and creating a new object can be avoided, which enhances system performance. In addition, recycling of objects reduces garbage collection time. Another benefit of recycling is that it helps reduce memory fragmentation by reusing an existing object that has the perfect size of memory already allocated to it. When memory becomes severely fragmented, the control mechanism takes a longer period of time to allocate memory to a new object. As can be seen from the many benefits discussed above, recycling of objects provides an enhancement to overall system performance.

Recycling an object in an object oriented system that has automatic garbage collection, such as a Java virtual machine, poses certain problems. The garbage collection mechanism typically makes no determination regarding whether or not an object can be recycled. Instead, the garbage collection mechanism automatically disposes of an object when the object is no longer referenced, thus deleting an object that may possibly be recycled if allowed to remain. Without a mechanism for recycling objects while allowing for automatic garbage collection of objects, the computer industry will continue to suffer from object oriented computer systems that do not fully take advantage of their potential performance.

DISCLOSURE OF INVENTION

In accordance with the present invention, a class may be made recyclable by inheriting a recycle() method from a recyclable class. When automatic garbage collection is attempted on an instance of a class that is recyclable, the garbage collector invokes the recycle() method on the instance to determine whether or not the instance should be disposed of by the garbage collector. One or more predetermined recycle criteria are used to determine whether a recyclable instance should, in fact, be recycled. If the instance satisfies the recycle criteria, appropriate recycling logic is executed to cause the instance to be recycled, and the garbage collection of the instance is not performed. If, however, the instance is not recyclable, or if it does not satisfy the recycling criteria, it is disposed of by the garbage collector.

The foregoing and other features and advantages of the invention will be apparent from the following more particular description of preferred embodiments of the invention, as illustrated in the accompanying drawings.

BRIEF DESCRIPTION OF DRAWINGS

The preferred embodiments of the present invention will hereinafter be described in conjunction with the appended drawings, where like designations denote like elements, and:

FIG. 4 is a class diagram showing how a class is made to be recyclable;

FIG. 5 is a class diagram of a Java object class that is recyclable in accordance with an alternative embodiment;

FIG. 6 is a class diagram of a Java object class that is recyclable in accordance with another alternative embodiment; and FIG. 7 is an object diagram showing the steps for performing automatic garbage collection when recyclable objects are present.

BEST MODE FOR CARRYING OUT THE INVENTION

Figure 1:
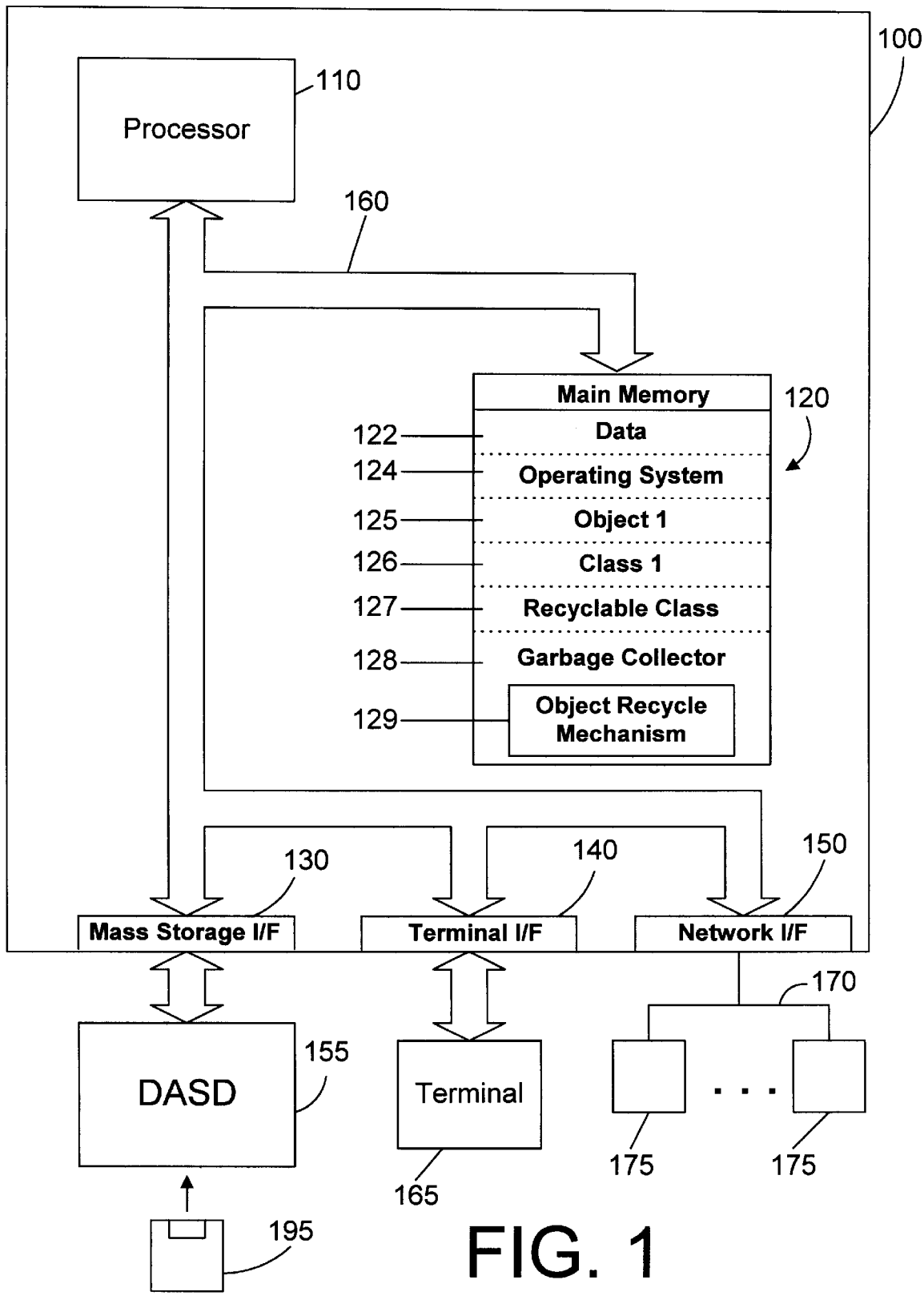
FIG. 1 is a block diagram of an apparatus in accordance with a preferred embodiment of the present invention.

The present invention is accomplished through the use of object oriented programming concepts. For those who are not familiar with object oriented programming concepts, the brief overview below provides background information that will help the reader to understand the present invention.

1. Overview

Object Oriented Technology v. Procedural Technology

Object oriented programming is a method of program implementation in which programs are organized as cooperative collections of objects, each of which represents an instance of some class, and whose classes are all members of a hierarchy of classes united via inheritance relationships. Object oriented programming differs from standard procedural programming in that it uses objects, not algorithms, as the fundamental building blocks for creating computer programs. This difference stems from the fact that the design focus of object oriented programming technology is wholly different than that of procedural programming technology.

The focus of procedural-based design is on the overall process used to solve the problem; whereas the focus of object oriented design is on casting the problem as a set of autonomous entities that can work together to provide a solution. The autonomous entities of object oriented technology are, of course, objects. Object oriented technology is significantly different from procedural technology because problems are broken down into sets of cooperating objects instead of into hierarchies of nested computer programs or procedures.

Thus, a pure object oriented program is made up of code entities called objects. Each object is an identifiable, encapsulated piece of code and data that provides one or more services when requested by a client. Conceptually, an object has two parts, an external object interface and internal object implementation. In particular, all object implementation functions are encapsulated by the object interface such that other objects must communicate with that object through its object interface. The only way to retrieve, process or otherwise operate on the object is through the methods defined on the object. This protects the internal data portion of the object from outside tampering. Additionally, because outside objects have no access to the internal implementation, that internal implementation can change without affecting other aspects of the program.

In this way, the object system isolates the requestor of services (client objects) from the providers of services (server objects) by a well defined encapsulating interface. In the classic object model, a client object sends request messages to server objects to perform any necessary or desired function. The message identifies a specific method to be performed by the server object, and also supplies any required parameters. The server object receives and interprets the message, and can then decide what operations to perform.

There are many computer languages that presently support object oriented programming techniques. For example, Smalltalk, Object Pascal, C++ and Java are all examples of programming languages that support object oriented programming to one degree or another.

Java Programming Language

Java is a modern object oriented programming language designed by Sun Microsystems that has grown in popularity in recent years. Java offers many features and advantages that makes it a desirable programming language to use. First, Java is specifically designed to create small application programs, commonly called "applets," that can reside on the network in centralized servers, and which are delivered to the client machine only when needed. Second, Java is completely platform independent. A Java program can be written once and can then run on any type of platform that contains a Java Virtual Machine (JVM). The JVM model is supported by most computer vendors, thereby allowing a software vendor to have access to hardware and software systems produced by many different companies. Finally, Java is an object oriented language, meaning that software written in Java can take advantage of the benefits of object oriented programming techniques.

As in other object oriented systems, operations in Java are performed by one object calling a method on another object. These objects can reside locally on the same machine or on separate JVM's physically located on separate computers or systems.

2. Detailed Description

According to a preferred embodiment of the present invention, an apparatus and method provide for recycling of objects in the presence of automatic garbage collection by defining a recyclable class, and by subclassing from the recyclable class any class that needs to be recyclable. The recyclable class defines a recycle() method that returns a TRUE if the object needs to be recycled and a FALSE otherwise. If an object does not need to be recycled, it is disposed of by the automatic garbage collector in the usual manner.

Referring to FIG. 1, a computer system 100 in accordance with the preferred embodiment is an enhanced IBM AS/400 computer system. However, those skilled in the art will appreciate that the mechanisms and apparatus of the present invention apply equally to any computer system, regardless of whether the computer system is a complicated multi-user computing apparatus or a single user workstation. As shown in FIG. 1, computer system 100 comprises a processor 110 connected to a main memory 120, a mass storage interface 130, a terminal interface 140, and a network interface 150. These system components are interconnected through the use of a system bus 160. Mass storage interface 130 is used to connect mass storage devices (such as a direct access storage device 155) to computer system 100. One specific type of direct access storage device is a floppy disk drive, which may store data to and read data from a floppy diskette 195.

Main memory 120 contains data 122, an operating system 124, one or more objects 125, one or more class definitions 126, a recyclable class 127, and a garbage collector 128 that includes an object recycle mechanism 129 in accordance with the preferred embodiment. Computer system 100 utilizes well known virtual addressing mechanisms that allow the programs of computer system 100 to behave as if they only have access to a large, single storage entity instead of access to multiple, smaller storage entities such as main memory 120 and DASD device 155. Therefore, while data 122, operating system 124, object 125, class 126, recyclable class 127, garbage collector 128, and object recycle mechanism 129 are shown to reside in main memory 120, those skilled in the art will recognize that these items are not necessarily all completely contained in main memory 120 at the same time. It should also be noted that the term "memory" is used herein to generically refer to the entire virtual memory of computer system 100.

Data 122 represents any data that serves as input to or output from any program in computer system 100. Operating system 124 is a multitasking operating system known in the industry as OS/400; however, those skilled in the art will appreciate that the spirit and scope of the present invention is not limited to any one operating system. Operating system 124 preferably supports an object oriented programming environment such as that provided, for example, by the Java programming language. Object 125 is an instance of the first class 126. Object 125 is made recyclable by first class 126 subclassing from or implementing the interface of the recyclable class 127. Note that the terms "object" and "instance" are used interchangeably herein. Because object 125 is recyclable, the object recycle mechanism 129 in garbage collector 128 will query object 125 before disposing of it to determine if it needs to be recycled. If object 125 does not need to be recycled, it is disposed of by garbage collector 119. If object 125 needs to be recycled, it is recycled in accordance with the teachings herein.

In the preferred embodiment, object recycle mechanism 129 is part of garbage collector 128. However, it is equally within the scope of the invention for object recycle mechanism 129 to be completely separate from garbage collector 128.

Processor 110 may be constructed from one or more microprocessors and/or integrated circuits. Processor 110 executes program instructions stored in main memory 120. Main memory 120 stores programs and data that processor 110 may access. When computer system 100 starts up, processor 110 initially executes the program instructions that make up operating system 124. Operating system 124 is a sophisticated program that manages the resources of computer system 100. Some of these resources are processor 110, main memory 120, mass storage interface 130, terminal interface 140, network interface 150, and system bus 160.

Although computer system 100 is shown to contain only a single processor and a single system bus, those skilled in the art will appreciate that the present invention may be practiced using a computer system that has multiple processors and/or multiple buses. In addition, the interfaces (called input/output processors in AS/400 terminology) that are used in the preferred embodiment each include separate, fully programmed microprocessors that are used to off-load compute-intensive processing from processor 110. However, those skilled in the art will appreciate that the present invention applies equally to computer systems that simply use I/O adapters to perform similar functions.

Terminal interface 140 is used to directly connect one or more terminals 165 to computer system 100. These terminals 165, which may be non-intelligent (i.e., dumb) terminals or fully programmable workstations, are used to allow system administrators and users to communicate with computer system 100.

Network interface 150 is used to connect other computer systems and/or workstations (e.g., 175 in FIG. 1) to computer system 100 across a network 170. The present invention applies equally no matter how computer system 100 may be connected to other computer systems and/or workstations, regardless of whether the network connection 170 is made using present-day analog and/or digital techniques or via some networking mechanism of the future. In addition, many different network protocols can be used to implement a network. These protocols are specialized computer programs that allow computers to communicate across network 170. TCP/IP (Transmission Control Protocol/Internet Protocol) is an example of a suitable network protocol.

It is also important to point out that the presence of network interface 150 within computer system 100 means that computer system 100 may engage in cooperative processing with one or more other computer systems or workstations on network 170. Of course, this in turn means that the programs and data shown in main memory 120 need not necessarily all reside on computer system 100. For example, one or more portions of object recycle mechanism 129 may reside on another system and engage in cooperative processing with one or more programs that reside on computer system 100. This cooperative processing could be accomplished through use of one of the well known client-server mechanisms such as remote procedure call (RPC).

At this point, it is important to note that while the present invention has been and will continue to be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks (e.g., 195 of FIG. 1) and CD ROM, and transmission type media such as digital and analog communications links.

Figure 2:
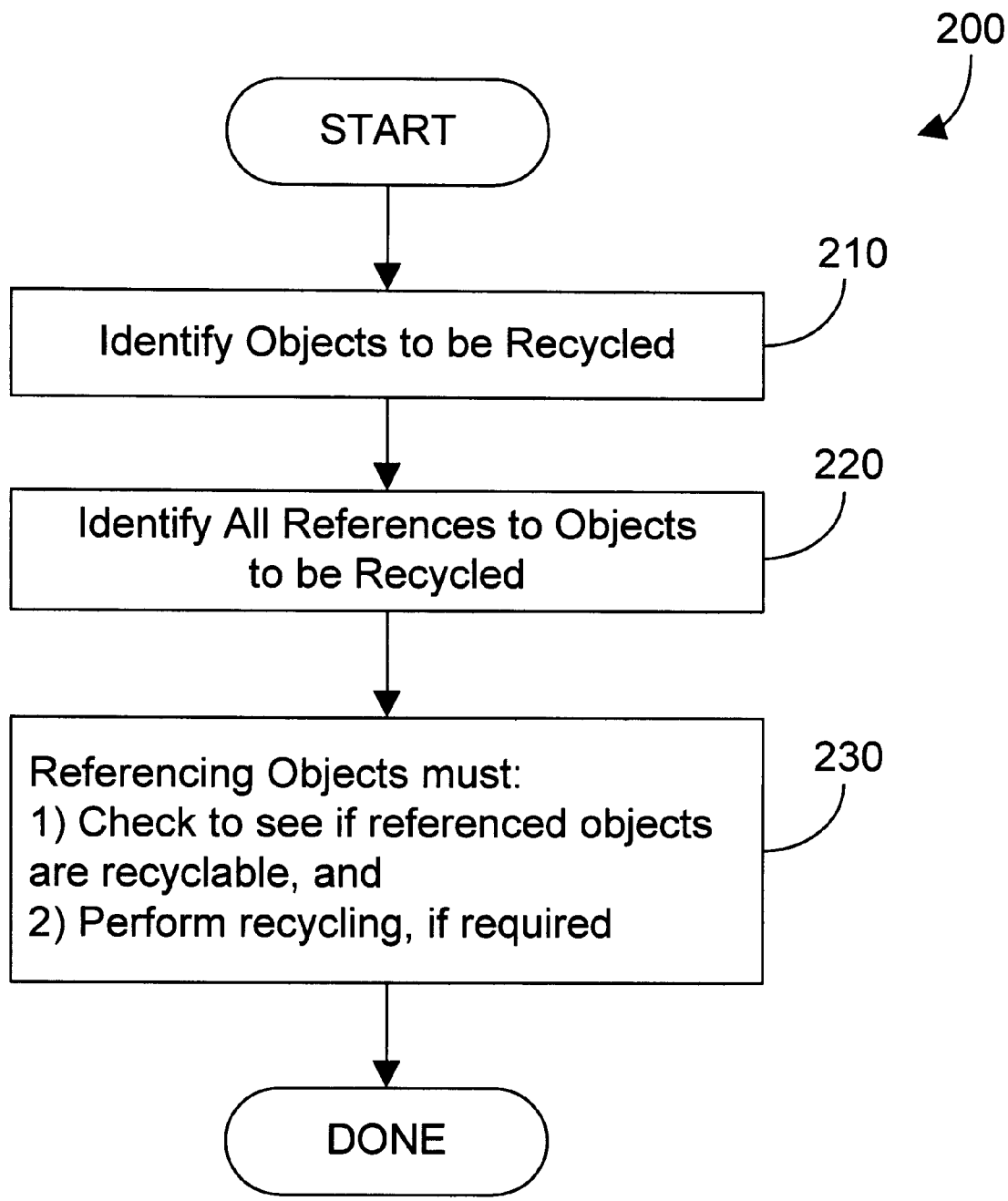
FIG. 2 is a flow diagram of one possible method for recycling objects in an object oriented system.

Referring to FIG. 2, a method 200 for recycling objects could be used by object recycle mechanism 129 of FIG. 1 to recycle objects in an object oriented system. Method 200 starts by identifying the objects to be recycled (step 210). Next, all objects that reference any of the objects to be recycled are identified (step 220). At this point, for an object to be recycled, each referencing object must 1) check to see if the referenced objects are recyclable, and 2) perform recycling of the object, if required (step 230).

One problem with method 200 is that it forces each referencing object to have intelligence and logic regarding the recycling of each referenced object. This recycling logic imposes significant overhead on the performance of a computer system that includes the recyclable objects. In addition, method 200 requires identification of all objects that reference an object to be recycled. In a distributed object system, where one object may invoke one or more remote objects, it is impossible to determine which objects reference a particular object. Compared to method 200 of FIG. 2, it would be preferable if recycling could occur "under the covers", meaning that the recycling would not require special logic or intelligence in the recyclable objects or in the objects that reference the recyclable objects.

Figure 3:
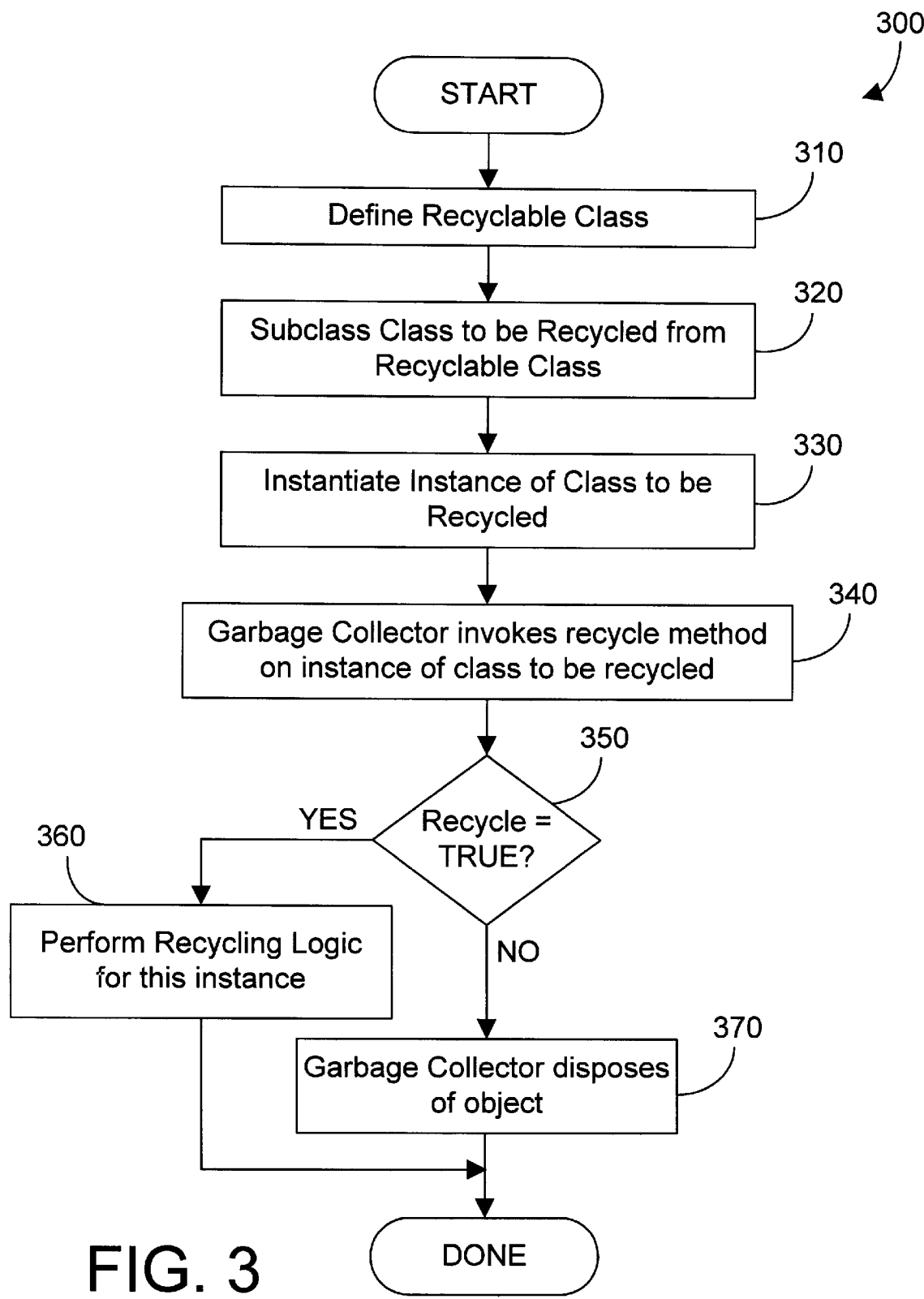
FIG. 3 is a flow diagram of a method for recycling objects in accordance with the preferred embodiments of the invention.

Referring to FIG. 3, a preferred method 300 in accordance with the preferred embodiment provides a way to recycle objects without significant overhead and without substantial changes to the objects to be recycled. First, a recyclable class is defined (step 310). Then, a class is made recyclable by subclassing from the recyclable class (step 320). Note that subclassing is used here in its broadest sense, and includes all means and methods presently know or developed in the future for inheriting one or more attributes of another class, including, for example, the implementation of an interface as defined in the Java programming language. At this point the subclass is recyclable, so instances of the subclass will be recyclable.

We assume that instances of the class to be recycled are instantiated as required by the execution of the computer program that includes or references instances of the class to be recycled (step 330). The system that instantiates these instances is a means for creating an instance of the recyclable class. We also assume that the computer program is executing in an environment, such as a Java virtual machine, that performs automatic garbage collection of objects that are no longer referenced. Before disposing of an object, the garbage collector invokes a recycle() method on the instance of the class to be recycled (step 340). The recycle() method returns a boolean value indicating whether or not the instance should be recycled. If the recycle() method returns TRUE (step 350=YES), method 300 performs recycling logic for this instance (step 360). However, if the recycle method returns FALSE (step 350=NO), the instance is disposed of by the garbage collector (step 370).

The recycle() method returns TRUE or FALSE depending on whether one or more recycle criteria are satisfied. These criteria are provided because it may not be desirable to recycle every recyclable object. For example, if instances of a particular class are created only rarely, it probably does not make sense to recycle instances of that class. Also, if there already exist some predetermined number of recycled objects, an instance of the same class would not be recycled because there is already sufficient quantity of recycled objects available in the system. These and many other recycle criteria not discussed herein are possible. In short, any criterion or criteria that could be used to determine whether or not a recyclable object should be recycled are within the scope of the present invention.

If the recycle() method returns TRUE (step 350=YES), step 360 performs recycling logic for this instance. The specific recycling logic depend on the configuration of the object oriented system. For example, if the system maintains a list of objects that are not currently used but are available for use, the recycling logic would include putting the object in the list.

Referring to FIG. 4, a class diagram shows how a class is made to be recyclable. A Recyclable abstract class is defined that includes a recycle() method that returns a TRUE if an instance is to be recycled and a FALSE otherwise. This Recyclable abstract class is a means for designating a class as recyclable through appropriate subclassing or implementation of interfaces. A class denoted Class 1 in FIG. 4 represents a class that needs to be made recyclable. To make the class recyclable, a class called Recyclable Class 1 is created which is a subclass of both Class 1 and the Recyclable abstract class. If we assume an implementation in Java, the Recyclable Class 1 can inherit the recycle() method from the Recyclable class by simply implementing the interface of the Recyclable class. The implementation of Recyclable Class 1 will suitably override or implement the recycle() method inherited from the Recycle class to provide a boolean response regarding whether or not an instance can be recycled based on specified recycle criteria.

Note that instances that are not recyclable will be instances of classes that are not subclasses of the Recyclable class. These instances will be handled by the garbage collector in the usual manner, being disposed of once the instance is no longer referenced.

In an alternative embodiment of the invention, a class can be made recyclable by including a recycle() method in a top-level class definition. For example, assuming a Java implementation, the abstract Object class in Java could be changed to include a recycle() method to indicate whether or not an instance should be recycled, as illustrated in FIG. 5. However, the drawback of this approach is that all Java Development Kits would have to implement this change to the Object abstract class.

Referring to FIG. 6, another alternative embodiment changes the definition of the finalize() method that would return a boolean indicating whether or not garbage collection should be performed. The finalize() method is a method on a Java object that is invoked after an object is garbage collected. The modified finalize() method determines whether or not to recycle an object. However, this embodiment requires that existing Java objects change their interfaces whether or not they are implementing the recycling logic, and is therefore not as attractive as the preferred embodiment.

Referring now to FIG. 7, an object diagram 700 illustrates one sample flow of operations to recycle an object. We assume that Recyclable Object 1 in FIG. 7 is an instance of Recyclable Class 1 in FIG. 4. When the garbage collector object is performing its routine garbage collection, it first determines whether the object is recyclable by determining whether the object is an instance of the recyclable class by invoking an "instanceof Recyclable()" method (step 1). Step 2 determines whether the object is recyclable based on the boolean value returned from the instanceof Recyclable() method. If the object is an instance of Recyclable, step 1 is TRUE, and more steps are required to determine whether the instance is to be recycled. If the object is not an instance of Recyclable, step 1 returns FALSE, and garbage collection of the object can occur (step 6).

If the object is an instance of Recyclable, the recycle() method on the object is invoked (step 3). As discussed above, the recycle() method returns TRUE if the object is to be recycled, i.e., if one or more specified recycle criteria are satisfied, and returns FALSE otherwise. If the recycle criteria are satisfied, step 4 performs the recycling logic, such as placing the object on a free list for future use. While this method is shown as an internal method on the Recyclable Object 1 instance, in reality the recycling logic may be implemented in a number of different locations, and step 4 would invoke one or more appropriate methods to cause Recyclable Object 1 to be recycled.

Finally, if the recycle() method returned TRUE, we know that the object has been recycled, and that no garbage collection is needed, so step 5 exits without performing garbage collection. However, if the recycle() method in step 3 returned FALSE, step 5 passes control to step 6, which performs garbage collection of the object, meaning that the object is appropriately disposed of.

The classes, objects and methods that recycle objects in accordance with the present invention collectively comprise a means for automatically recycling the instance during garbage collection. The garbage collector checks to see whether the instance is recyclable. If not, it is garbage collected. If the instance is recyclable, and if the instance satisfies one or more recycle criteria, the instance is recycled, and is not disposed of by the garbage collector. If the instance is recyclable but the recycle criteria are not met, the instance is disposed of by the garbage collector.

One of the principal advantages of the preferred embodiments disclosed herein is that changing the implementation of the Java garbage collector implements most of the changes needed to recycle objects. By changing the Java garbage collector to invoke the recycle() method on recyclable objects before garbage collecting, recycling is made possible even in the presence of automatic garbage collection. One significant advantage of this approach is that one Java virtual machine can implement the invention according to the preferred embodiments without impacting any existing Java objects. In addition, Java objects can be changed to be recyclable by implementing the Recyclable interface without affecting the ability of those objects to run on Java virtual machines that do not support object recycling in accordance with the present invention.

One skilled in the art will appreciate that many variations are possible within the scope of the present invention. Thus, while the invention has been particularly shown and described with reference to preferred embodiments thereof, it will be understood by those skilled in the art that these and other changes in form and details may be made therein without departing from the spirit and scope of the invention. For example, while the disclosure herein refers to discrete functions of the garbage collector 128 and the object recycle mechanism 129, one skilled in the art will recognize that these functions may be implemented by either or by any combination of the two.

I claim:

1. An apparatus comprising:
   at least one processor;
   a memory coupled to the at least one processor;
   an object residing in the memory, the object including at least one method that is invoked by a garbage collection mechanism to determine whether the object may be disposed of by the garbage collection mechanism; and
   an object recycle mechanism residing in the memory and executed by the at least one processor, the object recycle mechanism automatically recycling the object if the invocation of the at least one method during garbage collection indicates that the object may not be disposed of by the garbage collection mechanism.

2. The apparatus of claim 1 wherein the garbage collection mechanism disposes of the object if the invocation of the at least one method during garbage collection indicates that the object may be disposed of by the garbage collection mechanism.

3. The apparatus of claim 1 wherein the object recycle mechanism causes the object to be recycled if the invocation of the at least one method during garbage collection indicates that the object may not be disposed of by the garbage collection mechanism and at least one recycle criterion is satisfied.

4. The apparatus of claim 3 wherein the garbage collection mechanism disposes of the object if the object does not satisfy the at least one recycle criterion.

5. An apparatus comprising:
   a memory;
   means for designating a class as recyclable;
   means for creating an instance of the recyclable class in the memory, the instance including at least one method that is invoked by a garbage collection mechanism to determine whether the instance may be disposed of by the garbage collection mechanism; and
   means for automatically recycling the instance during garbage collection by invoking the at least one method on the instance.

6. A method for recycling an object, the method comprising the steps of:
   designating a class as recyclable;
   creating an instance of the recyclable class, the instance including at least one method that is invoked by a garbage collection mechanism to determine whether the instance may be disposed of by the garbage collection mechanism; and
   automatically recycling the instance during garbage collection by invoking the at least one method on the instance.

7. The method of claim 6 further comprising the step of disposing of the instance if the invocation of the at least one method during garbage collection indicates that the instance may be disposed of by the garbage collection mechanism.

8. The method of claim 6 further comprising the step of recycling the instance if the invocation of the at least one method during garbage collection indicates that the instance may not be disposed of by the garbage collection mechanism and at least one recycle criterion is satisfied.

9. The method of claim 8 further comprising the step of disposing of the instance if the instance does not satisfy the at least one recycle criterion.

10. The method of claim 6 wherein the step of automatically recycling the instance during garbage collection comprises the steps of:
    determining whether the instance is recyclable by invoking the at least one method;
    determining whether the instance satisfies at least one recycle criterion; and
    recycling the instance if the instance is recyclable and satisfies the at least one recycle criterion.

11. The method of claim 6 wherein the step of designating the class as recyclable comprises the steps of:
    providing a recyclable class having a recycle method; and
    subclassing the class from the recyclable class.

12. The method of claim 11 wherein the step of subclassing the class from the recyclable class comprises the step of the class implementing the interface of the recyclable class.

13. A method for providing a recyclable object, the method comprising the steps of:
    providing a recyclable class having a recycle method that is invoked by a garbage collection mechanism to determine whether the object may be disposed of by the garbage collection mechanism;
    subclassing a first class from the recyclable class; and
    creating an instance of the first class, wherein the instance comprises the recyclable object.

14. The method of claim 13 wherein the step of subclassing the first class from the recyclable class comprises the step of the first class implementing the interface of the recyclable class.

15. A program product comprising:
    an object recycle mechanism that automatically recycles an object during garbage collection if a recycle method on the object indicates that the object may be recycled when the recycle method is invoked by a garbage collection mechanism; and
    signal bearing media bearing the object recycle mechanism.

16. The program product of claim 15 wherein the signal bearing media comprises recordable media.

17. The program product of claim 15 wherein the signal bearing media comprises transmission media.

18. The program product of claim 15 wherein the garbage collection mechanism disposes of the object if the object is not recyclable.

19. The program product of claim 15 wherein the object recycle mechanism causes the object to be recycled if the invocation of the at least one method during garbage collection indicates that the object may not be disposed of by the garbage collection mechanism and at least one recycle criterion is satisfied.

20. The program product of claim 19 wherein the garbage collection mechanism disposes of the object if the object does not satisfy the at least one recycle criterion.

* * * * *